(12) United States Patent
Fletcher et al.

(10) Patent No.: US 9,915,370 B2
(45) Date of Patent: Mar. 13, 2018

(54) MAGNETICALLY ACTUATED SHUT-OFF VALVE

(71) Applicants: David E. Fletcher, Flint, MI (US);
Brian M. Graichen, Leonard, MI (US);
James H. Miller, Ortonville, MI (US);
Keith Hampton, Ann Arbor, MI (US)

(72) Inventors: David E. Fletcher, Flint, MI (US);
Brian M. Graichen, Leonard, MI (US);
James H. Miller, Ortonville, MI (US);
Keith Hampton, Ann Arbor, MI (US)

(73) Assignee: Dayco IP Holdings, LLC, Troy, MI (US)

( * ) Notice: Subject to any disclaimer, the term of this patent is extended or adjusted under 35 U.S.C. 154(b) by 0 days.

(21) Appl. No.: 15/416,612

(22) Filed: Jan. 26, 2017

(65) Prior Publication Data

US 2017/0138502 A1    May 18, 2017

Related U.S. Application Data

(62) Division of application No. 14/818,851, filed on Aug. 5, 2015, now Pat. No. 9,599,246.

(51) Int. Cl.
*F16K 31/06* (2006.01)
*F16K 31/08* (2006.01)
*F16K 3/02* (2006.01)

(52) U.S. Cl.
CPC ............ *F16K 31/0675* (2013.01); *F16K 3/02* (2013.01); *F16K 31/082* (2013.01)

(58) Field of Classification Search
CPC ....... F16K 31/0675; F16K 3/02; F16K 31/082
(Continued)

(56) References Cited

U.S. PATENT DOCUMENTS

| 2,204,142 A | 6/1940 | MacClatchie |
| 2,306,490 A | 12/1942 | Noble |

(Continued)

FOREIGN PATENT DOCUMENTS

| CA | 1063454 | 10/1975 |
| CN | 2085459 | 9/1991 |

(Continued)

OTHER PUBLICATIONS

U.S., Non-Final Office Action, U.S. Appl. No. 14/277,815, 16 pages (dated Mar. 23, 2017).

(Continued)

*Primary Examiner* — John Bastianelli
(74) *Attorney, Agent, or Firm* — FisherBroyles, LLP; Susan M. Oiler

(57) ABSTRACT

A latching solenoid gate valve is disclosed, and includes a housing defining a conduit having a flow path therethrough and a cavity separating the conduit into a first section and a second section. The latching solenoid assembly also includes a gate assembly enclosed within the cavity of the housing and a first solenoid assembly and a second solenoid assembly seated within the cavity with the gate assembly linearly translatable therebetween. The gate assembly includes a first gate member comprising magnetizable material and defining an opening therethrough. The first gate member is linearly movable within the cavity between an open position with the opening aligned with the conduit and a closed position with the opening out of alignment with the conduit. The first gate member is moved linearly from either the open position or the closed position.

10 Claims, 8 Drawing Sheets

(58) Field of Classification Search
USPC .............. 251/129.04, 129.09–129.1, 129.15, 251/326–329, 65
See application file for complete search history.

(56) References Cited

U.S. PATENT DOCUMENTS

| | | | |
|---|---|---|---|
| 2,705,610 A | 4/1955 | Hjulian | |
| 2,740,962 A | 6/1956 | Kreichman et al. | |
| 2,750,962 A | 6/1956 | Kreichman et al. | |
| 2,816,730 A | 12/1957 | Rabas | |
| 2,835,468 A | 5/1958 | Sparks | |
| 2,913,220 A | 11/1959 | Cover | |
| 2,953,346 A | 9/1960 | Liecke et al. | |
| 3,069,131 A | 12/1962 | Grove | |
| 3,113,757 A | 12/1963 | Nixon | |
| 3,203,447 A | 8/1965 | Bremner et al. | |
| 3,379,214 A | 4/1968 | Weinberg | |
| 3,478,771 A | 11/1969 | Johnson | |
| 3,534,307 A | 10/1970 | Spewock et al. | |
| 3,635,601 A | 1/1972 | Larson et al. | |
| 3,666,231 A | 5/1972 | Parodi et al. | |
| 3,706,321 A | 12/1972 | Vicari | |
| 3,768,774 A | 10/1973 | Baugh | |
| 3,871,616 A | 3/1975 | Taylor | |
| 4,004,258 A * | 1/1977 | Arnold .................. | F16K 31/082 137/554 |
| 4,010,928 A | 3/1977 | Smith | |
| 4,013,090 A | 3/1977 | Taylor | |
| 4,056,255 A | 11/1977 | Lace | |
| 4,146,209 A | 3/1979 | Leva | |
| 4,157,169 A | 6/1979 | Norman | |
| 4,179,099 A | 12/1979 | Pierce, Jr. | |
| 4,210,308 A | 7/1980 | Sims | |
| 4,253,487 A | 3/1981 | Worley et al. | |
| 4,321,652 A | 3/1982 | Baker et al. | |
| 4,340,336 A | 7/1982 | Clary | |
| 4,341,369 A | 7/1982 | Meyer | |
| 4,385,280 A | 5/1983 | Reisem | |
| 4,392,632 A * | 7/1983 | Gast ...................... | F16K 31/082 251/129.1 |
| 4,446,887 A | 5/1984 | Redmon et al. | |
| 4,535,967 A | 8/1985 | Babbitt et al. | |
| 4,568,058 A | 2/1986 | Shelton | |
| 4,585,207 A | 4/1986 | Shelton | |
| 4,638,193 A | 1/1987 | Jones | |
| 4,770,389 A * | 9/1988 | Bodine ................... | E21B 34/04 251/129.04 |
| 4,779,582 A | 10/1988 | Lequesne | |
| 4,809,742 A | 3/1989 | Grau | |
| 4,934,652 A | 6/1990 | Golden | |
| 5,000,215 A | 3/1991 | Phillips | |
| 5,020,774 A | 6/1991 | Christianson | |
| 5,059,813 A | 10/1991 | Shiroymama | |
| 5,144,982 A * | 9/1992 | Willbanks ............. | H01F 7/1646 137/625.5 |
| 5,172,658 A | 12/1992 | Hampton | |
| 5,195,722 A | 3/1993 | Bedner | |
| 5,234,088 A | 8/1993 | Hampton | |
| 5,235,941 A | 8/1993 | Hampton | |
| 5,377,955 A | 1/1995 | Baker | |
| 5,394,131 A | 2/1995 | Lungu | |
| 5,490,031 A | 2/1996 | Braun et al. | |
| 5,627,504 A | 5/1997 | Kleinhappl | |
| 5,685,519 A | 11/1997 | Bircann et al. | |
| 5,781,399 A | 7/1998 | Lanigan et al. | |
| 5,820,104 A | 10/1998 | Koyano et al. | |
| 5,909,525 A | 6/1999 | Miller et al. | |
| 5,982,605 A | 11/1999 | Massey et al. | |
| 6,057,750 A | 5/2000 | Sheng | |
| 6,158,718 A | 12/2000 | Lang et al. | |
| 6,164,322 A | 12/2000 | Najmolhoda et al. | |
| 6,199,587 B1 | 3/2001 | Shlomi et al. | |
| 6,337,612 B1 | 1/2002 | Kim et al. | |
| 6,357,721 B1 | 3/2002 | Maurer | |
| 6,425,410 B1 | 7/2002 | Taylor | |
| 6,442,955 B1 | 9/2002 | Oakner et al. | |
| 6,563,238 B1 | 5/2003 | Lee et al. | |
| 6,578,818 B1 | 6/2003 | Krimmer et al. | |
| 6,827,331 B1 | 12/2004 | Roos | |
| 6,856,222 B1 * | 2/2005 | Forck ................... | F02M 47/027 335/265 |
| 7,017,886 B1 | 3/2006 | Ngene-Igwe | |
| 7,108,008 B2 | 9/2006 | Moreno | |
| 7,126,449 B2 | 10/2006 | Nickel et al. | |
| 7,481,415 B2 * | 1/2009 | Reinicke ............... | F16K 31/082 251/129.1 |
| 7,523,916 B2 | 4/2009 | Fenton | |
| 7,849,674 B2 | 12/2010 | Masuda et al. | |
| 8,235,011 B2 | 8/2012 | Lengfeld et al. | |
| 8,561,392 B2 | 10/2013 | Ogunleye et al. | |
| 2002/0066877 A1 | 6/2002 | Nakagawa | |
| 2004/0113731 A1 | 6/2004 | Moyer et al. | |
| 2006/0016477 A1 | 1/2006 | Zaparackas | |
| 2006/0219302 A1 | 10/2006 | Knop | |
| 2007/0053133 A1 | 3/2007 | Evans | |
| 2007/0180816 A1 | 8/2007 | Masuda et al. | |
| 2007/0227478 A1 | 10/2007 | Fitzgerald | |
| 2008/0006791 A1 | 1/2008 | Reinicke | |
| 2008/0099090 A1 | 5/2008 | Cook | |
| 2008/0099710 A1 | 5/2008 | Jennings | |
| 2009/0020719 A1 | 1/2009 | Ishigaki | |
| 2009/0094009 A1 | 4/2009 | Muller | |
| 2011/0006240 A1 | 1/2011 | Williams et al. | |
| 2011/0132311 A1 | 6/2011 | Pursifull et al. | |
| 2011/0196541 A1 | 8/2011 | Bauman et al. | |
| 2012/0161049 A1 | 6/2012 | Alvarez et al. | |
| 2012/0256111 A1 | 10/2012 | Hoang et al. | |
| 2012/0256113 A1 | 10/2012 | Comeaux | |
| 2012/0286182 A1 | 11/2012 | Hoang et al. | |
| 2012/0313023 A1 | 12/2012 | Brock | |
| 2013/0061949 A1 | 3/2013 | Minezawa et al. | |
| 2013/0062548 A1 | 3/2013 | Yokomi | |
| 2013/0340732 A1 | 12/2013 | Pursifull et al. | |
| 2014/0353534 A1 | 12/2014 | Graichen et al. | |
| 2015/0060709 A1 | 3/2015 | Fletcher et al. | |
| 2015/0090355 A1 * | 4/2015 | Fletcher ............... | F16K 31/0668 137/630.12 |
| 2015/0128573 A1 | 5/2015 | Fletcher et al. | |
| 2015/0159677 A1 | 6/2015 | Hampton et al. | |
| 2015/0162155 A1 | 6/2015 | Hampton et al. | |
| 2015/0234391 A1 * | 8/2015 | Sabadin ................ | F16K 3/085 137/1 |
| 2015/0354600 A1 | 12/2015 | Fletcher et al. | |
| 2016/0153472 A1 | 6/2016 | Fletcher et al. | |

FOREIGN PATENT DOCUMENTS

| | | |
|---|---|---|
| CN | 1205065 | 1/1999 |
| CN | 2480633 | 3/2002 |
| CN | 2534389 | 2/2003 |
| CN | 2791391 | 6/2006 |
| CN | 2934798 | 8/2007 |
| CN | 101036012 | 9/2007 |
| CN | 101772624 | 7/2010 |
| CN | 201679974 | 12/2010 |
| CN | 101963240 | 2/2011 |
| CN | 201866285 | 6/2011 |
| CN | 102996837 | 3/2013 |
| DE | 501 348 | 7/1930 |
| DE | 2714933 | 10/1978 |
| DE | 3209199 | 9/1983 |
| DE | 19727602 | 10/1998 |
| DE | 19841499 | 3/2000 |
| EP | 0 577 933 | 1/1994 |
| EP | 1333207 | 6/2003 |
| GB | 1411303 | 10/1975 |
| JP | S59-214280 | 12/1984 |
| JP | S61-180423 | 8/1986 |
| JP | 3665674 | 6/2005 |
| WO | 95/29356 | 11/1995 |
| WO | 2001/014775 | 3/2001 |

(56) References Cited

FOREIGN PATENT DOCUMENTS

| WO | 2009/045140 | 4/2009 |
|---|---|---|
| WO | 2012/100287 | 8/2012 |
| WO | 2013/049643 | 4/2013 |

OTHER PUBLICATIONS

EP, Supplementary European Search Report; Patent Application No. 14840859.4; 7 pages, dated Mar. 22, 2017.
CN, Second Office Action and Search Report with English translation, Chinese Patent Application No. 2014103919357; 12 pages, dated Apr. 1, 2017.
U.S., Final Office Action, U.S. Appl. No. 14/473,151; 42 pages, dated Apr. 19, 2017.
PCT, International Search Report and Written Opinion, International Application No. US/2014/038018 (dated Nov. 26, 2014).
PCT, International Search Report and Written Opinion, International Application No. US/2014/053435 (dated Dec. 18, 2014).
PCT, International Search Report and Written Opinion, International Application No. US/2014/065252 (dated Feb. 19, 2015).
PCT, International Search Report and Written Opinion, International Application No. US/2014/069461 (dated Mar. 4, 2015).
PCT, International Search Report and Written Opinion, International Application No. US/2014/069528 (dated Mar. 10, 2015).
PCT, International Search Report and Written Opinion, International Application No. US/2014/069796 (dated Mar. 12, 2015).
U.S., Notice of Allowance; U.S. Appl. No. 14/539,656; (dated Dec. 15, 2015).
U.S., Non-Final Office Action, U.S. Appl. No. 14/277,815, (dated Jan. 15, 2016).
CN, Search Report; Patent Application No. 201480001143.2 (dated Jan. 22, 2016).
CN, Office Action; Patent Application No. 201480001143.2 (dated Feb. 3, 2016).
CN, English Translation of First Office Action; Patent Application No. 2014800011432 (dated Feb. 3, 2016).
CN, Search Report; Patent Application No. 2014800021010 (dated Mar. 22, 2016).
CN, First Office Action; Patent Application No. 2014800021010 (dated Mar. 30, 2016).
U.S., Non-Final Office Action; U.S. Appl. No. 14/473,151; (dated May 19, 2016).
U.S., Non-Final Office Action; U.S. Appl. No. 14/567,450; (dated May 19, 2016).
U.S., Non-Final Office Action; U.S. Appl. No. 14/565,814; (dated Jul. 21, 2016).
CN, Search Report with English translation; Patent Application No. 201480002102.5; (dated Jul. 26, 2016).
CN, Office Action with English translation; Patent Application No. 201480002102.5; (dated Aug. 3, 2016).
U.S., Final Office Action; U.S. Appl. No. 14/277,815; (dated Aug. 5, 2016).
CN, Office Action and Search Report with English translation; Patent Application No. 201410391935.7; (dated Sep. 2, 2016).
CN, Office Action and Search Report with English translation; Patent Application No. 201480002180.5; (dated Sep. 2, 2016).
U.S., Notice of Allowance; U.S. Appl. No. 14/567,450; (dated Oct. 11, 2016).
U.S., Advisory Action; U.S. Appl. No. 14/277,815; (dated Oct. 20, 2016).
U.S., Notice of Allowance; U.S. Appl. No. 14/818,851; (dated Nov. 3, 2016).
PCT, International Search Report and Written Opinion of the International Searching Authority, International Application No. PCT/US2016/045565, 15 pages, (dated Dec. 8, 2016).
EP, Supplementary European Search Report and Opinion, European Patent Application No. 14805033, 7 pages (dated Dec. 15, 2016).
CN, Search Report with English Translation, Chinse Patent Application No. 2014800620394, 4 pages (dated Dec. 13, 2016).
CN, Office Action with English Translation, Chinse Patent Application No. 2014800620394, 8 pages (dated Dec. 30, 2016).
U.S., Notice of Allowance, U.S. Appl. No. 14/565,814, 12 pages (dated Feb. 28, 2017).

* cited by examiner

MAGNETICALLY ACTUATED SHUT-OFF VALVE

PRIOR APPLICATION

This is a divisional application of U.S. patent application Ser. No. 14/818,851 filed Aug. 5, 2015.

TECHNICAL FIELD

This application relates to shut-off valves having on and off positions, and more particularly to magnetically actuated solenoid valves for use in an internal combustion engine.

BACKGROUND

In current actuators, the on/off operation in a pneumatic device is achieved with an electric solenoid valve. Vacuum force is applied to the actuator only when the solenoid is "on" and only when the vacuum force is high enough to move the actuator the full length of its travel. Alternately, without a solenoid controlling the actuator's exposure to vacuum, an actuator exposed to vacuum force under all conditions will "float" between the on position and the off position. Floating is undesirable, inefficient, and provides poor control of the device attached to the actuator.

Often, solenoid actuated valves are spring biased to a default condition and require the application of current to a coil to move the valve to the energized position. However, as long as the valve is in the on-state, then it is to be appreciated that power is consumed. Thus, there is a need in the art for energy efficient actuators that are effective at controlling an electric solenoid's on-state, while reducing the amount of power consumed.

SUMMARY

Herein actuators are described for the control of valves having on-off functionality that consume less power. The actuators disclosed herein are held in either the open state or the closed state without requiring the continuous consumption of power because the actuators utilize the application of electric current through a solenoid to move a valve to a desired position and once moved thereto the residual magnetism will maintain the valve in the desired position. Additionally, the state of the valve (in the open position or in the closed position) is determined electronically by a control circuit based on changes in the inductance of the actuation coils (a first coil at one end and a second coil at the opposing end of the gate assembly) due to the location of the gate.

In one aspect, a latching solenoid gate valve is disclosed, and includes a housing defining a conduit having a flow path therethrough and a cavity separating the conduit into a first section and a second section. The latching solenoid assembly also includes a gate assembly enclosed within the cavity of the housing and a first solenoid assembly and a second solenoid assembly seated within the cavity with the gate assembly linearly translatable therebetween. The gate assembly includes a first gate member comprising magnetizable material and defining an opening therethrough. The first gate member is linearly movable within the cavity between an open position with the opening aligned with the conduit and a closed position with the opening out of alignment with the conduit. The first gate member is moved linearly from either the open position or the closed position by activating one of the first and second solenoid assemblies to magnetically attract the first gate member thereto while simultaneously activating the other of the first and second solenoid assemblies to magnetically repulse the first gate member.

DETAILED DESCRIPTION

Figure 1:
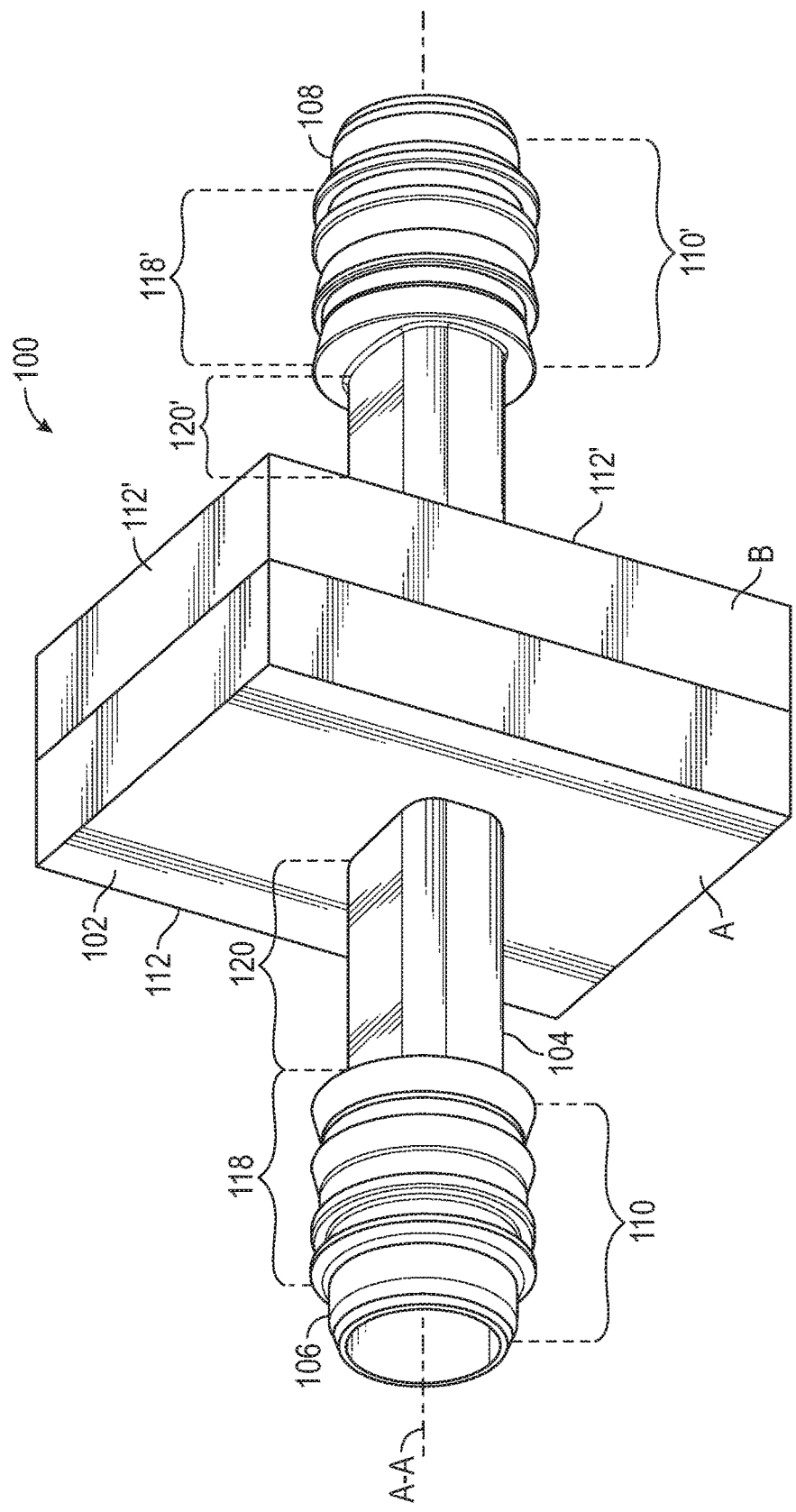
FIG. 1 is a front perspective view of one embodiment of a latching solenoid gate valve.

The following detailed description will illustrate the general principles of the invention, examples of which are additionally illustrated in the accompanying drawings. In the drawings, like reference numbers indicate identical or functionally similar elements.

As used herein, "fluid" means any liquid, suspension, colloid, gas, plasma, or combinations thereof.

Figure 2:
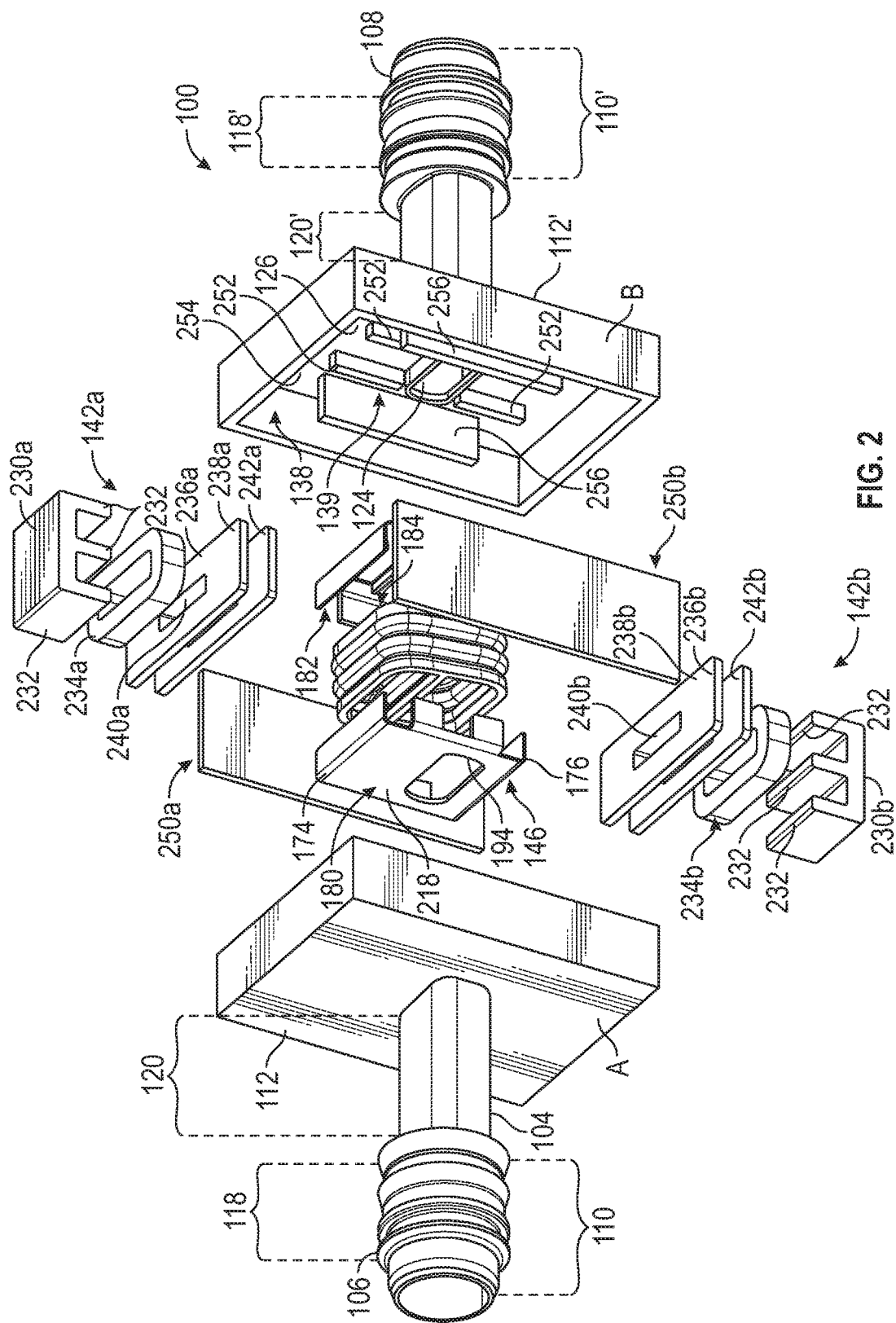
FIG. 2 is a front, exploded perspective view of the latching solenoid gate valve of FIG. 1.

FIGS. 1-2 illustrate an embodiment of a latching solenoid gate valve 100, in one embodiment, for use in an internal combustion engine. The latching solenoid gate valve 100 includes a housing 102 and a conduit 104 for transporting or allowing the flow of fluid therethrough. The housing 102 defines a cavity 138 (FIG. 2) therein that separates the conduit 104 into a first conduit portion 106 and a second section 108. The housing 102 may include a first section A and a second section B that are mateable together to define the cavity 138. In one embodiment, the first section A and the second section B of the housing 102 may be plastic injection molded components fixedly mated together using a plastic welding process.

The first conduit portion 106 may be sealingly engaged with a hose or a tube (not illustrated), where a generally fluid-tight seal may be created between the sealing features 118 of the first conduit portion 106 and the tube. One or both of the first and second conduit portions 106, 108 may include a first section 110, 110' that may include sealing features 118, 118' on the exterior surface thereof. One or both of the first and second conduit portions 106, 108 may also include a second section 120, 120', respectively, between the first sections 110, 110' and the outer surface 112, 112' of the housing 102. In one embodiment, the first section 110 of the first conduit portion 106 may include a generally circular cross-section and the second section 120 of the first conduit portion 106 may include a generally rectangular cross-section. The second conduit portion 108 may include a similar configuration. Although a circular cross-section and a rectangular cross-section are discussed, the conduits 106, 108 are not limited to the illustration as shown in the figures, and it is understood that many other cross-sectional shapes are possible.

Figure 3:
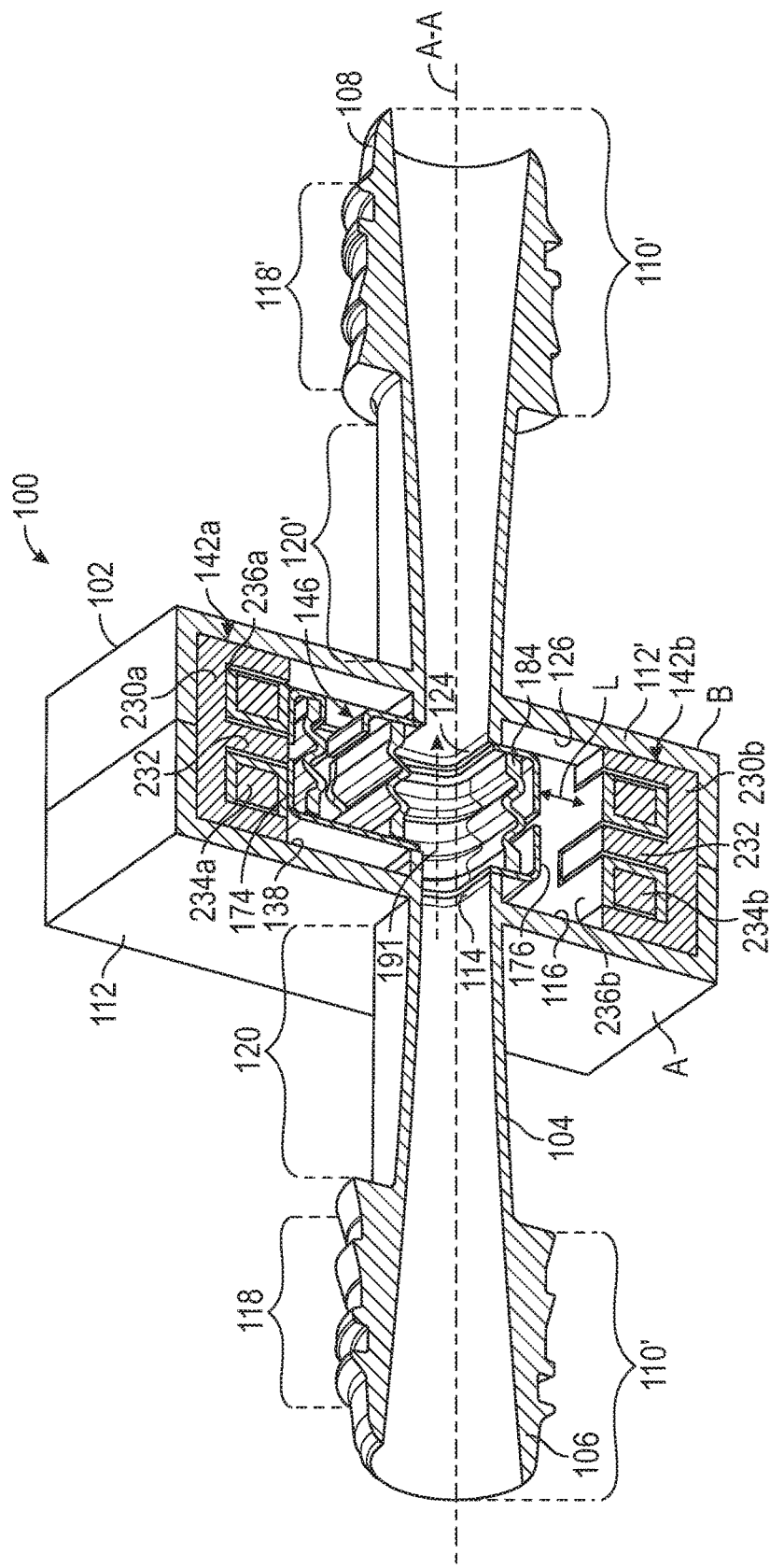
FIG. 3 is a longitudinal, cross-sectional view of the latching solenoid gate valve of FIG. 2 in an assembled state.

Referring to FIGS. 2 and 3, an opening 114 of the housing A is in fluid communication with the first conduit portion 106. The opening 114 of the housing A is located along an inner surface 116 of the first section A of the housing 102. An opening 124 of the housing B is in fluid communication with the second conduit portion 108, and is located along an inner surface 126 of the second section B of the housing 102. The opening 114 of the housing A and the opening 124 of the housing B are aligned with one another such that both the openings 114, 124 are located along an axis A-A defined by the conduit 104. A first solenoid assembly 142a and a second solenoid assembly 142b are seated within the cavity 138 defined by the first section A and the second section B of the housing 102. A gate assembly 146 is linearly translatable between the first solenoid assembly 142a and the second solenoid assembly 142b.

The gate assembly 146 may translate in a linear direction between an open position and a closed position. In the open position, which is seen in FIG. 3, a fluid flow opening 191 of the gate assembly 146 may be aligned with the conduit 104, and in particular the gate assembly 146 is aligned with the openings 114 and 124. Thus, in the open position fluid may flow from the first conduit portion 106 through the gate assembly 146, and into the second conduit portion 108. When in the closed position, the fluid flow opening 191 is out of alignment with the conduit 104, thereby blocking the flow of fluid though the gate assembly 146 and to the second conduit portion 108. As seen in FIG. 3, the gate assembly 146 may be translated up and down in a linear direction through a length of travel L between the open position and the closed position. The length of travel L may be measured between a lower surface 176 of the gate assembly 146 and the second solenoid assembly 142b when the gate assembly 146 is in a first position (i.e., the gate assembly 146 is opened). Alternatively, the length of travel L may be measured between an upper surface 174 of the gate assembly 146 and the first solenoid assembly 142a, when the gate assembly 146 is in a second position (i.e., the gate assembly 146 is closed).

Figure 4:
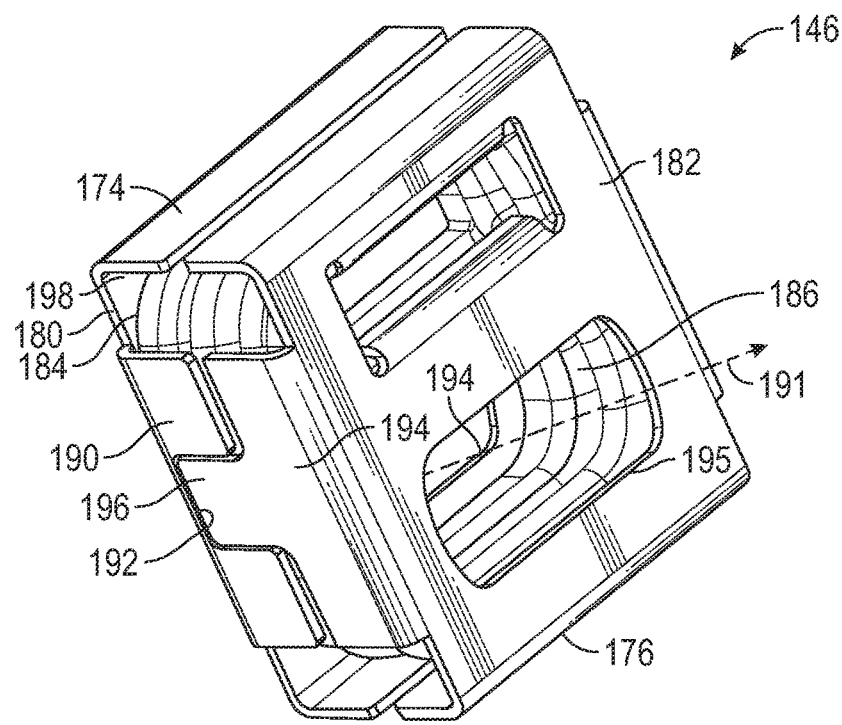
FIG. 4 is a side perspective view of the sprung gate of the latching solenoid gate valve of FIGS. 1-3.
Figure 5:
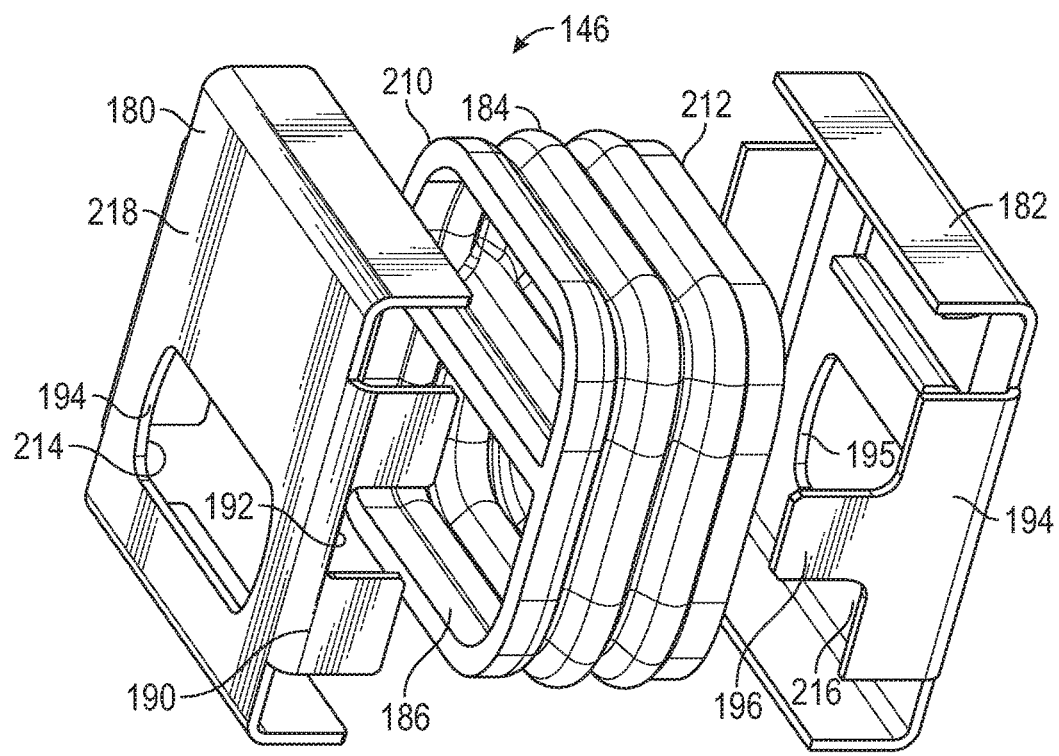
FIG. 5 is an exploded view of the sprung gate of the latching solenoid gate valve of FIGS. 1-3.
Figure 6:
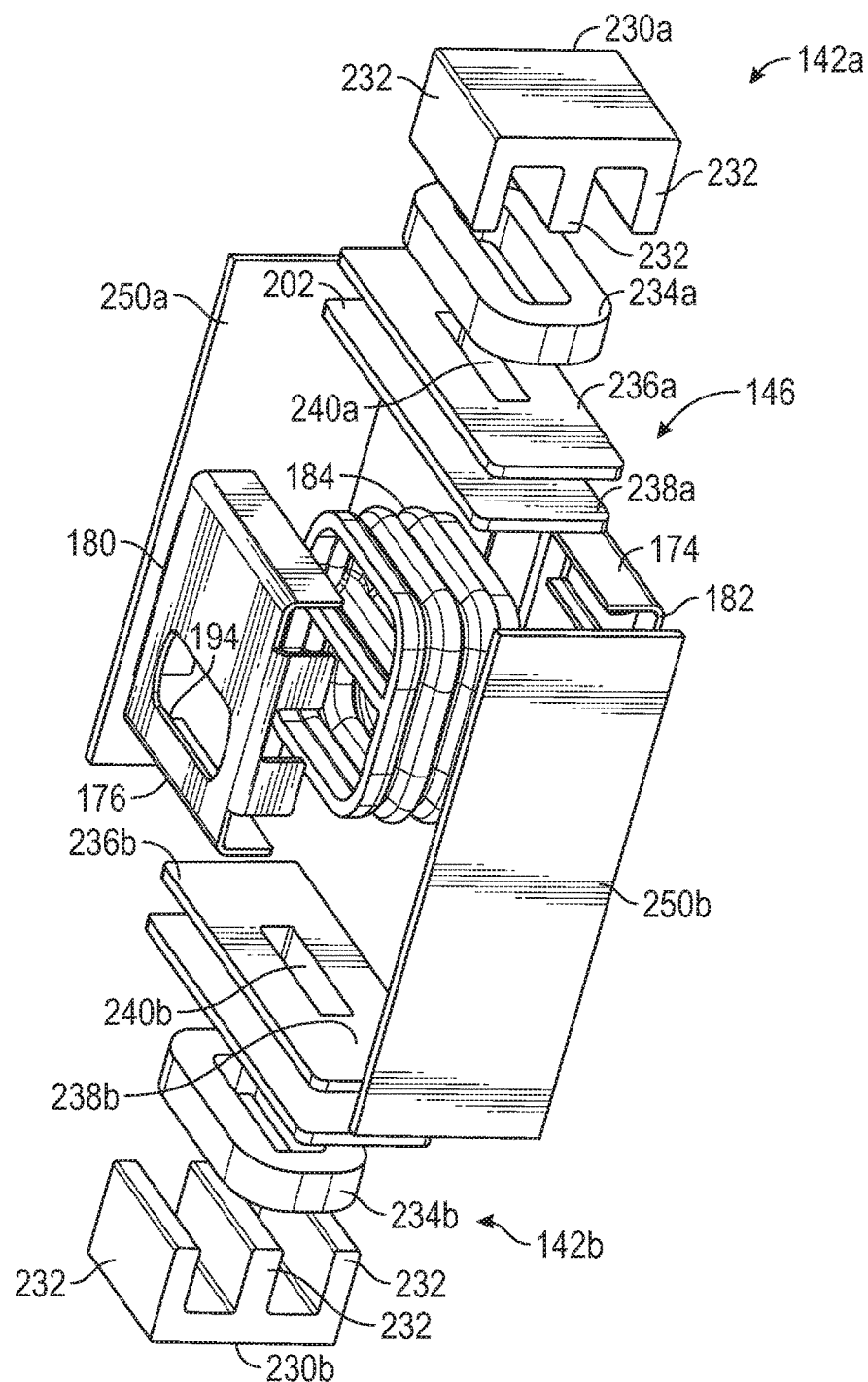
FIG. 6 is an exploded view of the sprung gate and the latching solenoids of FIGS. 1-3.
Figure 7:
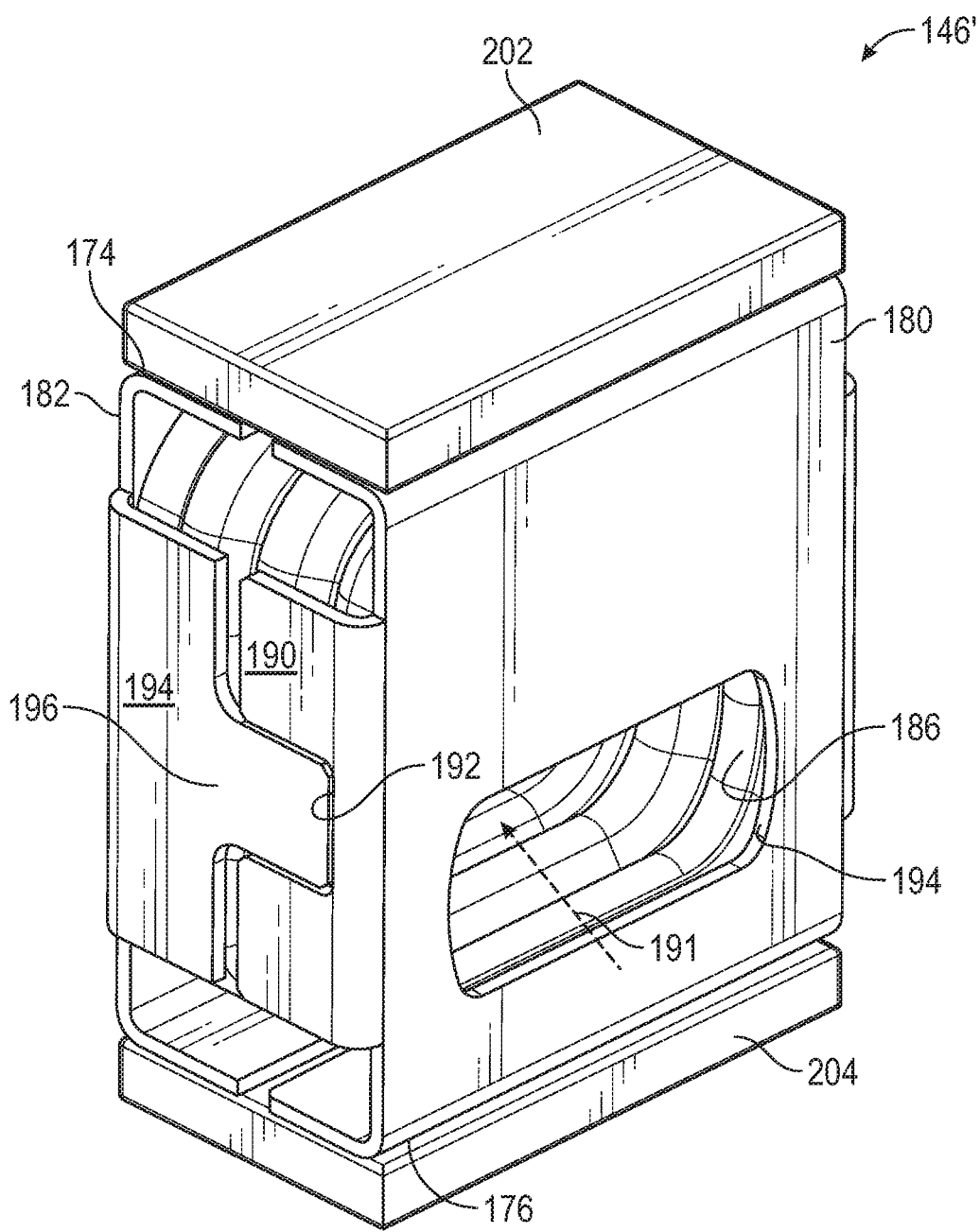
FIG. 7 is a side perspective view of a second embodiment of a sprung gate for a latching solenoid gate valve.

FIG. 4 is a side perspective view of the gate assembly 146, FIG. 5 is an exploded view of the gate assembly 146, FIG. 6 is an exploded view of the gate assembly 146 as well as both the solenoid assemblies 142a, 142b, and FIG. 7 is a perspective view of the gate assembly 146 as well as two permanent magnets 202, 204. Referring to FIGS. 4-6, the gate assembly 146 includes a first gate member 180 defining an opening 194 therethrough, and a second gate member 182 defining at least a first opening 195 therethrough aligned with the opening 194 in the first gate member 180. The openings 194 and 195 cooperate together to define the fluid flow opening 191. The gate assembly 146 may also include an endless elastic band 184 sandwiched or located between the first and second gate members 180, 182.

The first and second gate members 180, 182 may each be constructed of a magnetizable material such as, for example, steel, and may be stamped parts that are heat treated and coated in order to substantially prevent wear and corrosion. In one embodiment, the first and second gate members 180, 182 are constructed of the magnetizable material, and have been permanently magnetized during manufacture. In another embodiment, the first and second gate members 180, 182 have a magnetizable material connected to the first and second gate members 180, 182. For example, as seen in FIG. 7, the gate assembly 146 includes a first permanent magnet 202 disposed along the upper surface 174 of the gate assembly 146 and a second permanent magnet 204 disposed along the lower surface 176 of the gate assembly 146.

Referring to FIGS. 2 and 6, the gate assembly 146 is positioned between the first (upper, in the drawing as oriented relative to the page) solenoid assembly 142a and the second (lower, in the drawing as oriented relative to the page) solenoid assembly 142b. The upper surface 174 and the lower surface 176 of the gate assembly 146 are both defined collectively by the first gate member 180 and the second gate member 182 when in an assembled state (illustrated in FIG. 3). As seen in FIGS. 4 and 5, the first gate member 180 and the second gate member 182 interlock with one another. In this exemplary embodiment, a side surface 190 of the first gate member 180 may define a recess 192. The second gate member 182 includes a side surface 194 that defines a tab 196. The tab 196 of the second gate member 182 may be received by the recess 192 of the first gate member 180. Those skilled in the art will readily appreciate that while FIGS. 4-5 only illustrate one side of the first gate member 180 and the second gate member 182, a similar configuration may be included along the opposing sides of the gate members 180, 182 as well.

Referring to FIGS. 4 and 5, the endless elastic band 184 is located between the first and second gate members 180, 182. The endless elastic band 184 defines an opening 186 that is aligned with the opening 194 in the first gate member 180 and opening 195 in the second gate member 182. With the endless elastic band 184 sandwiched between the first and second gate member 180, 182, the endless elastic band is linearly translatable and moves in concert with the gate assembly 146 through the length of travel L (shown in FIG. 3). The endless elastic band 184 may be constructed of a compliant material such as, for example, rubber. The endless elastic band 184 may act as a biasing member or compliant spring in order to bias the first gate member 180 and the second gate member 182 apart from one another. As seen in FIG. 4, when the gate assembly 146 is assembled together, the endless elastic band 184 may be contained by a cavity or recess 198 defined by both of the first gate member 180 and the second gate member 182.

Referring to FIG. 5, the endless elastic band 184 includes a first lip 210 and a second lip 212. The first lip 210 of the elastic band 184 may seal against an inner surface 214 of the first gate member 180, and the second lip 212 may seal against an inner surface 216 of the second gate member 182. It should be appreciated that the seal created between the endless elastic band 184 and the first gate member 180 and the second gate member 182 may reduce or prevent fluid leakage into the housing 102 (FIGS. 1-2). It should also be appreciated that the illustration of the gate assembly 146 should not be limiting in nature. For example, in another approach a gate assembly may be used that includes the configuration as shown in FIG. 7 of commonly owned U.S. patent application Ser. No. 14/565,814 filed on Dec. 10, 2014, which is herein incorporated by reference in its entirety.

Referring to FIGS. 2 and 4-5, the first gate member 180 may define a front gate surface 218. When the gate assembly 146 is in the closed position, the front gate surface 218 of the first gate member 180 may block or obstruct the flow of fluid into the fluid flow opening 191 of the gate assembly 146. However, when the gate assembly 146 is in the open position, which is seen in FIG. 3, fluid may flow from the first conduit portion 106 of the housing A, through the fluid flow opening 191 defined by the gate assembly 146, and into the second conduit portion 108 of the second housing B.

Referring to FIGS. 2 and 6, both the first solenoid assembly 142a and the second solenoid assembly 142b each include a respective core 230a, 230b. The cores 230a, 230b may be constructed of a magnetic material. In the exemplary embodiment as shown in FIG. 4, the cores 230a, 230b may both be generally E-shaped cores, however it is to be appreciated that the disclosure is not limited to only E-shaped cores. It should also be appreciated that while the cores 230a, 230b as shown in the figures include three legs 232 of equal size, the legs of each core 230a, 230b may be of different size as well.

Figure 8:
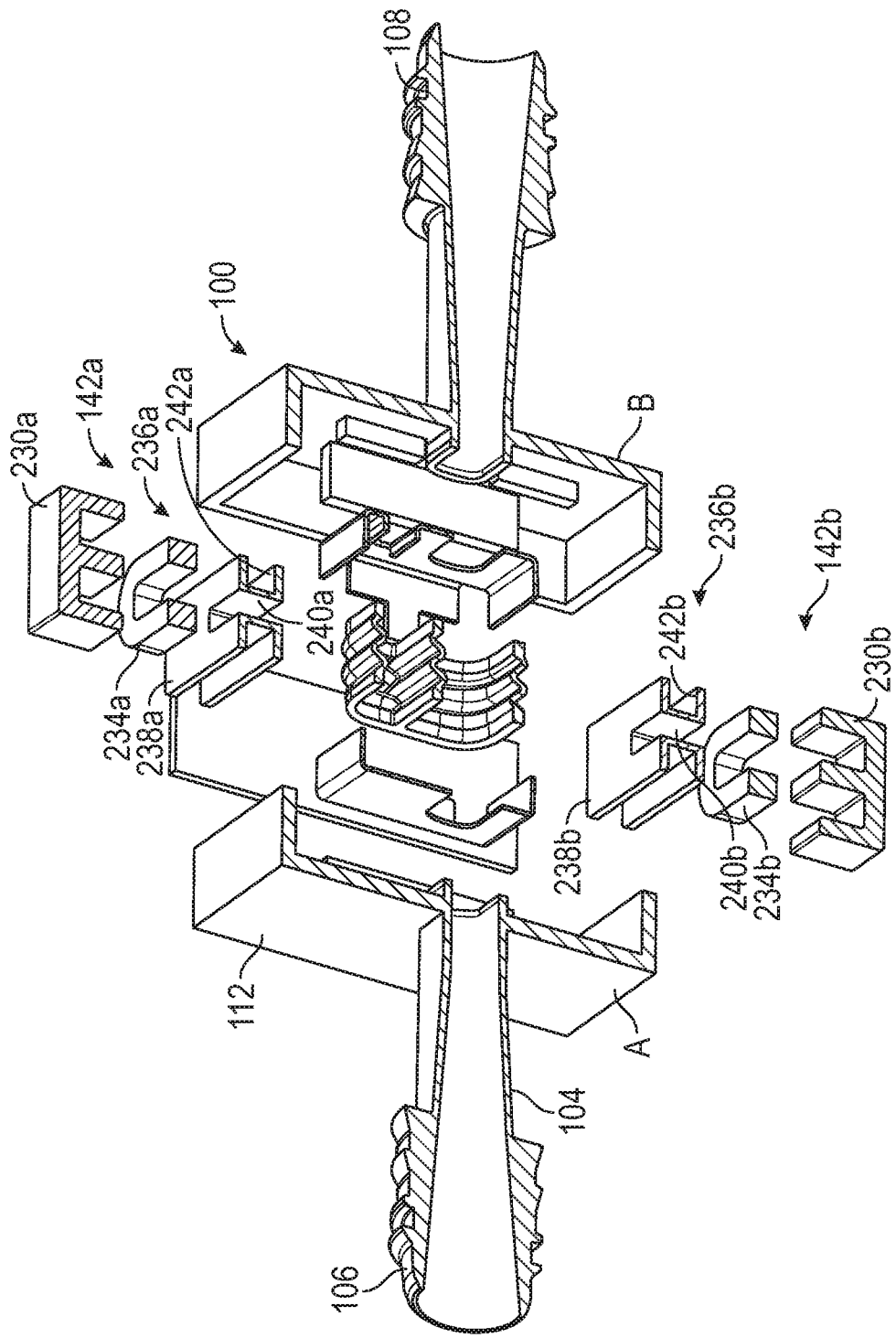
FIG. 8 is a cross-sectional, exploded perspective view of the latching solenoid gate valve of FIG. 1.

Continuing to refer to both FIGS. 2 and 6, bobbins 236a, 236b may surround the center leg 232 of each core 230a, 230b. In one embodiment, the bobbins 236a, 236b may be constructed of plastic, and may be manufactured by a plastic injection molding process. Although a plastic injection molding process is described, it is to be understood that other approaches and materials may be used as well to manufacture the bobbins 236a, 236b. The bobbins 236a, 236b each include a main body 238a, 238b. Referring to FIGS. 2, 6, and 8, the bobbins 236a, 236b each include a generally I-shaped cross section defining a centrally located aperture 240a, 240b and respective channels 242a, 242b (shown in FIG. 8).

Corresponding wiring may be wound around the respective channels 242a, 242b of each core 230a, 230b to create windings 234a, 234b. The windings 234a, 234b may be any type of wire for carrying an electrical current such as, for example, copper wiring. The respective apertures 240a, 240b of the bobbins 236a, 236b may be shaped to receive the central leg 232 of a respective core 230a, 230b. It should be appreciated that the bobbins 236a, 236b may be used to hold the windings 234a, 234b in place. It should also be appreciated that the windings 234a, 234b may be connected to terminals (not illustrated). The terminals may project outward from the bobbins 236a, 236b, where each terminal may be electrically coupled to a corresponding circuit board 250a, 250b. As explained in greater detail below, the circuit boards 250a, 250b may include circuitry for activating the solenoid assemblies 142a, 142b.

As seen in FIG. 2, the second section B of the housing 102 may include one or more guides 252 that project outward from an inner wall 254 of the second section B. The guides 252 may be used to provide guidance and ensure that the gate assembly 146 translates in a linear direction through the length of travel L (shown in FIG. 3). The second section B of the housing 102 may each include a second set of guides 256 that also project outward from an inner wall 254 of the second section B. The guides 256 may be used to position the circuit board 250a, 250b in place within the housing 102. In addition to controlling the solenoid assemblies 142a, 142b, the circuit boards 250a, 250b may also be positioned within the housing 102 in order to provide mechanical support and stiffening. It is to be appreciated that the first housing A also includes similar features along an inner wall as well, however these features are not visible in FIG. 2.

Referring to both FIGS. 1 and 2, it should be appreciated that the housing 102 may also include electrical connectors (not illustrated) that are electrically connected to a corresponding one of the circuit boards 250a, 250b. The electrical connectors may each protrude from an opening defined by the housing (not illustrated), and electrically connect the circuit boards 250a, 250b to an external controller (not illustrated). For example, in one embodiment, the external control may be an engine control module (ECM).

The gate assembly 146 may be normally seated in a starting position. The starting position may be either the closed position or the open position (shown in FIG. 3). The gate assembly 146 remains seated in the starting position until a threshold force is applied to the gate assembly 146. The threshold force is explained in greater detail below, and is created by opposing magnetic fields induced within the cores 230a, 230b. The threshold force is of a magnitude sufficient to unseat the gate assembly 146 from the starting position, and causes the gate assembly 146 to move into a second position. The second position is opposite from the normally seated position. For example, if the normally seated position is the open position (shown in FIG. 3), then the second position would be the closed position. It is to be appreciated that the gate assembly 146 is biased in either the open or the closed position due to residual magnetism within the first gate member 180 and the second gate member 182 after the opposing magnetic fields have been removed.

Referring to FIGS. 2-3, when electrical current is applied to the winding 234a, a first magnetic field is induced within the core 230a of the solenoid 142a. The first magnetic field may be based on the amount of electrical current provided to the winding 234a. Specifically, a first amount of electrical current may be applied to the winding 234a, which in turn creates the first magnetic field. The first magnetic field may attract the residually magnetized first gate member 180 and second gate member 182. In other words, the first magnetic field may urge the first gate member 180 and second gate member 182 in a direction towards the core 230a, and into the open position as seen in FIG. 3.

At the same time the first amount of electrical current is applied to the winding 234a, a second, opposite amount of electrical current is applied to the winding 234b in order to induce a second magnetic field within the core 230b of the solenoid 142b. It is to be appreciated that the second, opposite magnetic field is generated to repel the residually magnetized first gate member 180 and second gate member 182. In other words, the second magnetic field may urge the first gate member 180 and the second gate member 182 in a direction away from the core 230b, and towards the core 230a. The first magnetic field induced by the core 230a and the second, opposite magnetic field induced by the core 230b cooperate together in order to create the threshold force. The threshold force is of sufficient magnitude to urge the gate assembly 146 to translate in the linear direction through the length of travel L and into the second position (i.e., into the open position as seen in FIG. 3). Although actuating the gate assembly 146 into the open position is described, it is to be appreciated that the current supplied to the windings 234a, 234b may be switched in direction in order to switch the direction of the first magnetic field and the second magnetic field, thereby actuating the gate assembly 146 into the closed position as well.

Figure 9:
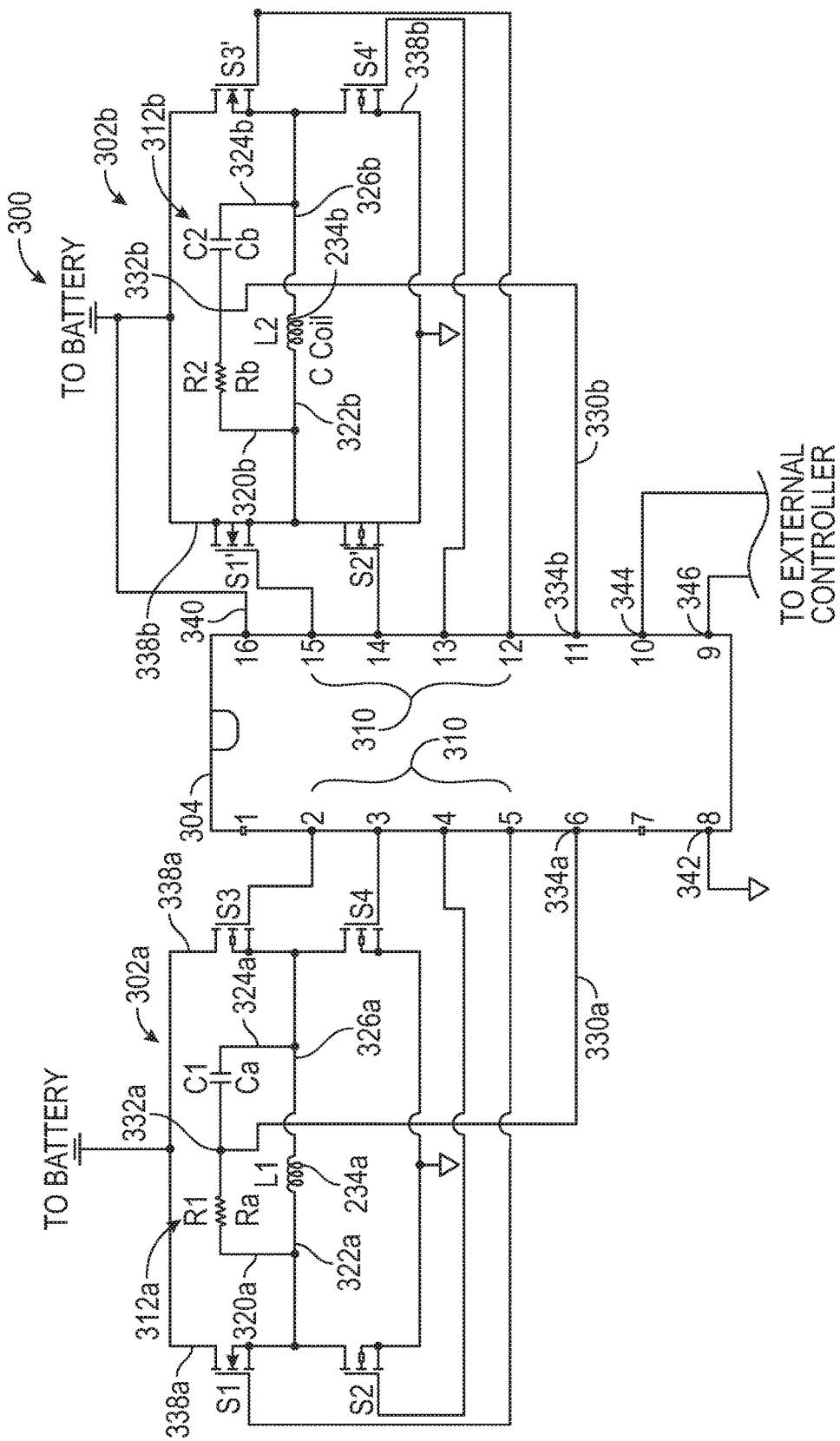
FIG. 9 is an electrical schematic diagram of a circuit that drives the solenoid assemblies and also senses the position of the gate assembly in the latching solenoid gate valve of FIG. 1.

FIG. 9 is a schematic diagram of an electrical circuit 300 used to provide the current to the windings 234a, 234b. As explained below, the electrical circuit 300 may also be used in combination with the external controller (not illustrated) to determine the position of both of the first gate member 180 and the second gate member 182. The electrical circuit 300 includes two H bridges 302a, 302b and a microcontroller 304 in communication with both of the H bridges 302a, 302b. Referring to both FIGS. 2 and 9, it is to be appreciated that in one embodiment the electrical circuit 300 may be completely located upon one of the circuit boards 250a, 250b, and the remaining one of the circuit boards 250a, 250b is merely used for mechanical support of the housing 102. Alternatively, in another embodiment, a portion of the electrical circuit 300 may be located on both of the circuit boards 250a, 250b, and a connector (not illustrated) may be used to electrically connect both of the circuit boards 250a, 250b together.

Referring to FIG. 9, each H bridge 302a, 302b may include four switches. Specifically, the H bridge 302a includes switches S1, S2, S3, S4 and the H bridge 302b includes four switches S1', S2', S3', S4'. In the embodiment as shown in FIG. 9, the switches are each metal-oxide-semiconductor field-effect transistors (MOSFETs), however it is to be appreciated that other types of switches, or even mechanical switches may be used as well. Each of the switches may be electrically connected to an output or pin 310 of the microcontroller 304. Each H bridge 302a, 302b may also include a resistor $R_a$, $R_b$ that is electrically connected to a capacitor $C_a$, $C_b$ in series with one another to form a corresponding series circuit 312a, 312b. As seen in FIG. 9, a first end 320a, 320b of the series circuit 312a, 312b may be connected to a first end 322a, 322b of the winding 234a, 234b, and a second end 324a, 324b of the series circuit 312a, 312b may be connected to a second end 326a, 326b of the winding 234a, 234b. It is to be appreciated that the H bridges 302a, 302b enables a voltage to be applied across the respective loads (i.e., the respective windings 234a, 234b) in either direction. A sense line 330a, 330b may electrically connect a junction 332a, 332b located between the resistor $R_a$, $R_b$ and the capacitor $C_a$, $C_b$ to corresponding sense pins 334a, 334b of the microcontroller 304.

The microcontroller 304 may refer to, be part of, or include an electronic circuit, a combinational logic circuit, a field programmable gate array (FPGA), a processor (shared, dedicated, or group) that executes code, other suitable components that provide the described functionality, or a combination of some or all of the above, such as in a system-on-chip. The term module may include memory (shared, dedicated, or group) that stores code executed by the processor. The term code, as used above, may include software, firmware, microcode, or assembly code and may refer to programs, routines, functions, classes, or objects. It is to be appreciated that while FIG. 9 illustrates the H bridges 302a, 302b and the microcontroller 304 as separate components, in another embodiment the H bridges 302a, 302b and the microcontroller 304 could be an integrated component.

Referring to FIGS. 2-3 and 9, the microcontroller 304 may energize the respective pins 310 in order to activate the switches S1 and S4 (which are located on alternating legs 338a of the H bridge 302a) to induce a current across the winding 234a of the solenoid assembly 142a, thereby inducing the first magnetic field within the core 230a of the solenoid 142a. The first magnetic field magnetically attracts the gate members 180, 182 of the gate assembly 146. The microcontroller 304 simultaneously energizes the respective pins 310 in order to activate the switches S2' and S3' (which are located on alternating legs 338b of the H bridge 302b) to induce a current across the winding 234a of the solenoid assembly 142a, thereby inducing the second magnetic field within the core 230b of the solenoid 142b. The first magnetic field magnetically repels the gate members 180, 182 of the gate assembly 146. Thus, the gate assembly 146 is actuated into the open position.

While the switches S1, S4, S2', S3' are described as being activated, it is to be appreciated that the microcontroller 304 may also energize the respective pins 310 in order to activate the switches S2, S3, S1', S4' as well in order to actuate the gate assembly 146 into the closed position. Thus, it is to be appreciated that the circuit boards 250a, 250b may include circuitry for activating the solenoid assemblies 142a, 142b from either the open position or the closed position by activating one of the first and second solenoid assemblies 142a, 142b to magnetically attract the gate members 180, 182, while simultaneously activating the remaining solenoid assembly 142a, 142b to magnetically repulse the gate members 180, 182.

Referring to FIG. 9, the microcontroller 304 may also include an input 340 for receiving power, such as battery voltage. The microcontroller 304 may also be connected to ground through pin 342. Furthermore, the microcontroller 304 may also send and receive communication from the external controller (not illustrated) through pins 344, 346. As explained above, the external control may be, for example, an ECM. The external controller may send a signal to the microcontroller 304 requesting a current position of the gate assembly 146 with respect to the core 230a, and is explained in greater detail below. Referring to FIGS. 2-3 and 9, in response to receiving a signal from the external controller requesting the current position of the gate assembly 146 from pin 344, the microcontroller 304 may generate a time varying voltage over a predetermined period of time across both the windings 234a, 234b through both of the H bridges 302a, 302b. Specifically, the microcontroller 304 may alternate the time varying voltage to the alternating legs 338a, 338b of the H-bridges 302a, 302b in order to energize and de-energize both of the windings 234a, 234b.

In one embodiment, the time varying voltage may be square wave voltage having a fixed frequency (e.g., 20 kHz). Specifically, it should be appreciated that the inductance of the winding 234a, the resistor $R_a$, and the capacitor $C_a$ (or the winding 234b, the resistor $R_b$, and the capacitor $C_b$) may cooperate together to create a circuit that oscillates in response to an excitation created by the square voltage. The value of the inductance of the windings 234a, 234b is not fixed, and will vary based on the location of the gate members 180, 182. Specifically, the inductance of the windings 234a, 234b will increase if the gate members 180, 182 are near, and will decrease if the gate members 180, 182 are farther away. It is to be appreciated that the time varying voltage may include a variety of values, however a peak-to-peak voltage of at least two volts may be required.

As the microcontroller 304 generates the time varying voltage, the microcontroller 304 may also monitor the sense lines 330a, 330b. Specifically, the microcontroller 304 may monitor the sense lines 330a, 330b to determine an amplitude of oscillation of the inductance of the windings 234a, 234b. As explained above, the inductance of the windings 234a, 234b is not fixed, and will vary based on the location of the gate members 180, 182. Specifically, a largest amplitude of oscillation is indicative of the location of the gate members 180, 182 relative to the windings 234a, 234b.

Instead of a time varying voltage, in another embodiment a sweeping frequency may be applied to both the windings 234a, 234b. The sweeping frequency may range from a value below a resonant frequency of the inductance of the winding 234a, the resistor $R_a$, and the capacitor $C_a$ (or the winding 234b, the resistor $R_b$, and the capacitor $C_b$) to a value above the resonant frequency, and may be an increasing range of frequencies or a decreasing range of frequencies. As the microcontroller 304 generates the sweeping frequency, the microcontroller 304 may also monitor the sense lines 330a, 330b. Specifically, the microcontroller 304 may monitor the sense lines 330a, 330b to determine a peak voltage amplitude of the windings 234a, 234b. The peak voltage amplitude is correlated to the distance of the gates 180, 182 relative to the windings 234a, 234b.

Referring to FIGS. 2-3 and 9, the microcontroller 304 may send a signal over pin 346 to the external control indicative of the distance of the gates 180, 182 relative to the windings 234a, 234b. The external controller may receive the signal indicative of the position of the gates 180, 182, and determine a different position of the gate assembly 146 based on the current position of the gates 180, 182. For example, if the gate assembly 146 is in the open position, the external controller may determine that the different position is the closed position.

The device 100 as described above and illustrated in FIGS. 1-9 is a solenoid actuated control valve that may be used in a variety of applications, such as automotive applications, and may control the flow of fluids such as air, coolant, fuel, or oil. It is to be understood that the valves currently available may be spring biased to a default position, and require the application of current to a solenoid coil to move the valve to an "on" position. As long as the valve is on, power is being consumed. The disclosed valve assembly does not require the continuous application of power to hold the disclosed gate assembly in either the open or closed position. Furthermore, the disclosed device also provides an approach for determining the current position of the valve electronically.

Having described the invention in detail and by reference to preferred embodiments thereof, it will be apparent that modifications and variations are possible without departing from the scope of the invention.

What is claimed is:

1. A latching solenoid gate valve comprising:
    a housing defining a conduit having a flow path therethrough and a cavity separating the conduit into a first section and a second section;
    a gate assembly enclosed within the cavity of the housing, the gate assembly comprising:
        a first gate member comprising magnetizable material and defining an opening therethrough, the first gate member being linearly movable within the cavity between an open position with the opening aligned with the conduit and a closed position with the opening out of alignment with the conduit;
    a first solenoid assembly and a second solenoid assembly seated within the cavity with the gate assembly linearly translatable therebetween;
    wherein the first gate member is moved linearly from either the open position or the closed position by activating one of the first and second solenoid assemblies to magnetically attract the first gate member thereto while simultaneously activating the other of the first and second solenoid assemblies to magnetically repulse the first gate member
    wherein each of the first solenoid assembly and the second solenoid assembly comprise a circuit board and a winding electrically connected to the circuit board; and
    wherein the circuit board comprises a microcontroller electrically connected to a first H bridge for the first solenoid assembly with the winding of the first solenoid assembly as a load of the first H bridge, and wherein the microcontroller is electrically connected to a second H bridge for the second solenoid assembly with the winding of the second solenoid assembly as a load of the second H bridge; wherein the first and second H bridges are electrically connected to the microcontroller to each energize the winding in the first solenoid assembly and the second solenoid assembly, respectively, with current in either direction.

2. The latching solenoid gate valve of claim 1, wherein the core is a generally E-shaped core.

3. The latching solenoid gate valve of claim 1, wherein the first H bridge comprises a first resistor and a first capacitor electrically connected in a first series circuit with one end of the first series circuit connected to a first end of the winding of the first solenoid assembly and the other end of the first series circuit connected to a second end of the winding of the first solenoid assembly, and a first sense line electrically connected at a first junction between the first resistor and the first capacitor is electrically coupled to the microcontroller.

4. The latching solenoid gate valve of claim 3, wherein the second H bridge comprises a second resistor and a second capacitor electrically connected in a second series circuit with one end of the second series circuit connected to a first end of the winding of the second solenoid assembly and the other end of the second series circuit connected to a second end of the winding of the second solenoid assembly and a second sense line electrically connected at a second junction between the second resistor and the second capacitor is electrically coupled to the microcontroller.

5. The latching solenoid gate valve of claim 3, wherein the gate assembly further comprises an endless elastic band sandwiched between the first gate member and the second gate member with a second opening defined by the endless elastic band aligned with the opening in the first gate member, wherein the endless elastic band is linearly translatable together with the first and second gate members within the cavity.

6. The latching solenoid gate valve of claim 3, wherein the housing includes at least one guide protruding within the cavity between which the gate assembly is seated.

7. The latching solenoid gate valve of claim 1, wherein the housing further comprises an electrical connector protruding therefrom that electrically connects the circuit board to an external controller.

8. The latching solenoid gate valve of claim 1, wherein the gate assembly further comprises a second gate member having a second opening therethrough, wherein both the first gate member and the second gate member are linearly translatable together within the cavity.

9. The latching solenoid gate valve of claim 8, wherein the first gate member and the second gate member are constructed of a magnetizable material.

10. The latching solenoid gate valve of claim 8, wherein the gate assembly includes a first permanent magnet disposed along an upper surface of the gate assembly and a second permanent magnet disposed along a lower surface of the gate assembly.

* * * * *